United States Patent
Ahrndt et al.

(10) Patent No.: US 6,925,157 B1
(45) Date of Patent: Aug. 2, 2005

(54) METHOD FOR OPERATING DEVICES FOR TRANSMITTING HIGH-BIT-RATE DATA ON AN EXTENSION LINE AND ARRANGEMENT HAVING SUCH DEVICES FOR DATA TRANSMISSION

(75) Inventors: Thomas Ahrndt, Munich (DE); Anke Gerwens, Munich (DE); Karl Kloppe, Munich (DE); Johann Neumayer, Dachau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/484,650

(22) Filed: Jan. 18, 2000

(30) Foreign Application Priority Data

Jan. 18, 1999 (DE) .......................................... 199 01 756

(51) Int. Cl.[7] .......................... H04M 11/00; H04J 1/14; H04B 3/10
(52) U.S. Cl. .................... 379/93.05; 370/491; 370/496; 375/219; 375/222; 379/93.01; 379/395.01; 379/413
(58) Field of Search .................................. 370/465, 466, 370/467, 468, 480, 485, 487, 491, 453, 494, 495, 496, 497, 295; 375/219, 220, 222, 221; 379/93.01, 93.05, 93.06, 93.07, 93.09; 399/395.01, 413

(56) References Cited

U.S. PATENT DOCUMENTS

| | | | |
|---|---|---|---|
| 5,243,593 A | | 9/1993 | Timbs |
| 5,629,926 A | | 5/1997 | Deutsch et al. |
| 5,781,728 A | | 7/1998 | Rybicki et al. |
| 5,815,505 A | | 9/1998 | Mills |
| 5,852,630 A | | 12/1998 | Langberg et al. |
| 6,052,411 A | * | 4/2000 | Mueller et al. ............. 375/222 |
| 6,061,392 A | * | 5/2000 | Bremer et al. .............. 375/222 |
| 6,075,814 A | * | 6/2000 | Yamano et al. ............. 375/222 |
| 6,353,628 B1 | * | 3/2002 | Wallace et al. ............. 375/220 |
| 6,426,961 B1 | * | 7/2002 | Nimmagadda ............... 370/493 |
| 6,665,350 B1 | * | 12/2003 | Bartkowiak ................. 375/275 |

OTHER PUBLICATIONS

Klussmann, Niels, "Lexikon der Kommunikations–und Informations–technik," Heidelberg: Huthig, 1997 (with English translation).

* cited by examiner

*Primary Examiner*—Duc Ho
*Assistant Examiner*—Thomas E. Volper
(74) *Attorney, Agent, or Firm*—Aslan Baghdadi; Shaw Pittman LLP

(57) ABSTRACT

In a method and apparatus for data transmission and voice signal transmission on a subscriber line, in terminal devices located at least on a network side of the subscriber line, only those parts which evaluate a criterion indicating the beginning of the data transmission are switched into active mode outside the context of data transmission.

12 Claims, 2 Drawing Sheets

METHOD FOR OPERATING DEVICES FOR TRANSMITTING HIGH-BIT-RATE DATA ON AN EXTENSION LINE AND ARRANGEMENT HAVING SUCH DEVICES FOR DATA TRANSMISSION

BACKGROUND OF THE INVENTION

The present invention relates to a method for operating devices for transmitting high-bit-rate data on a subscriber line connecting a subscriber terminal device and a telephone exchange on which voice information and low-bit-rate data can also be transmitted. The method is implemented in the course of data transmission connections leading to a data communication network that bypass the central parts of the telephone exchange, whereby there can be a permanent connection between the devices at the subscriber side and at the network side and an access device of the data transmission network.

The present invention also relates to an arrangement having such devices for transmitting high-bit-rate data on a line.

Data transmission on subscriber lines that connect subscriber terminal devices to a telephone exchange, that serve primarily for transmitting voice signals and low-bit-rate data, and that are realized in the form of twisted pair copper wiring, plays a significant role because it would be very cost-intensive to lay separate subscriber lines to terminal devices which comprise other devices for generating and receiving data besides telephone devices, such as personal computers (PCs) and TV devices, and on the other hand, because of the available bandwidth, the existing copper cable network is poorly utilized by the telephone traffic alone. The history of what is known as copper access technology, that is, technology for digital transmission on copper cables, began with the now customary modems (modulator/demodulator). Modems which operate in the voice frequency range achieve transmission rates of up to 56 Kbit/s via existing telephone lines and have meanwhile almost reached the theoretically maximum transmission rates in the frequency region they use. Such modems transmit and receive in the same frequency region and were made possible only by great advances in digital signal processing, semiconductor technology and in the underlying algorithms.

These conventional modem connections do not meet the demand for a capability to transmit large data volumes such as are involved in connection with the aforementioned terminal devices, and furthermore, they do not provide a uniform transmission of voice and data via the subscriber line.

Some assistance is found in what is known as xDSL technology, whereby DSL stands for Digital Subscriber Line. In this technology, the copper line is divided into three different channels by inserting xDSL modems. One of these channels is still available for conventional telephone service, that is, for voice transmission (POTS: Plain Old Telephone Service). A second channel is made available for connecting the user to the service provider, and a third channel serves to transmit data from the service provider back to the customer. What are known as POTS splitters are typically used on the subscriber side and on the network side of the subscriber line in order to separate the voice channel from the data channels.

What is known as ADSL technology (Asymmetric Digital Subscriber Line) is a popular representative of xDSL technology, this designating a technology that allows the transmission of a high-bit-rate bit stream from a central office to the subscriber and the transmission of a low-rate stream that runs from the subscriber to the central office. Because of this asymmetric transmission technology with respect to bit rate, an ADSL system is suited to such services as video on demand. But ADSL is also particularly suitable for Internet applications, where the bit stream from the central office to the subscriber (downstream) is likewise typically of a significantly higher rate than the upstream bit stream, which primarily serves for transmitting control information relating to the selecting and requesting of data.

In contemporary ADSL technology, the transmission rate of the upstream channel typically varies between 16 Kbit/s and 640 Kbit/s, and the transmission rate of the downstream channel typically varies between 2,048 Mbit/s and 9.6 Mbit/s (depending, for example, on the type and length of cable).

Such high-bit-rate data transmissions are no longer handled completely via the telephone network, as is the case in the conventional modem connections described above; rather, they are branched onto a data transmission network so as to avoid the central parts of the telephone exchange. To this end, permanent connections are set up between the corresponding data transmission means at the subscriber side and at the network side and an access device to the data network. This means that the devices that terminate the extension line are in permanent operation even outside the context of data transmissions, so that excess operating current is made available, leading to unnecessary heat. This is a significant disadvantage, since there are a number of such devices in the service area of telephone exchanges that are unified in part into one assembly that combines the connection of several subscriber lines.

SUMMARY OF THE INVENTION

It is therefore, an object of the present invention to provide a method that leads to more favorable relations in this regard.

This object is achieved in accordance with the invention in a method for operating high-bit-rate data transmission devices on a subscriber line connecting a subscriber terminal device and a telephone exchange, wherein voice information and low-bit-rate data can also be transmitted on the subscriber line, and wherein during a transmission of high-bit-rate data, a connection for transmitting the high-bit-rate data bypasses a core region of the telephone exchange and connects to a data transmission network as a permanent connection between a high-bit-rate data transmission device at the subscriber side and a high-bit-rate data transmission device at the telephone exchange side and an access device of the data transmission network. According to the method, in a high-bit rate data transmission device that terminates a subscriber line at a telephone exchange side and in a high-bit-rate data transmission device that terminates the subscriber line at a subscriber side, outside a context of a data transmission, operating only those parts of the high-bit-rate data transmission devices that evaluate a criterion indicating a beginning of a data transmission; and operating remaining parts of the high-bit-rate data transmission devices only when the criterion indicates a beginning of a data transmission.

This object is also achieved in accordance with the invention in an arrangement operating according to the method.

Accordingly, in an embodiment, in the device that terminates the extension circuit at the network side and/or at the subscriber side, outside the context of a data transmission only those parts are ready for operation which serve to watch for the occurrence of a criterion indicating the intention to transmit data; the remaining parts are switched into an operative state only upon the determination of such a criterion.

In an embodiment, given the use of an ADSL system, the signaling tones that respectively occur in the upstream and downstream channels are evaluated as criterion for the intention to transmit data. Accordingly, an already existing signaling is used here, so that no additional outlay is necessary.

In further embodiments of the invention, such criteria are formed either permanently or in defined intervals, whereby it is possible to account for practical requirements.

These and other features of the invention(s) will become clearer with reference to the following detailed description of the presently preferred embodiments and accompanied drawings.

DETAILED DESCRIPTION OF THE PRESENTLY PREFERRED EMBODIMENTS

Figure 1:
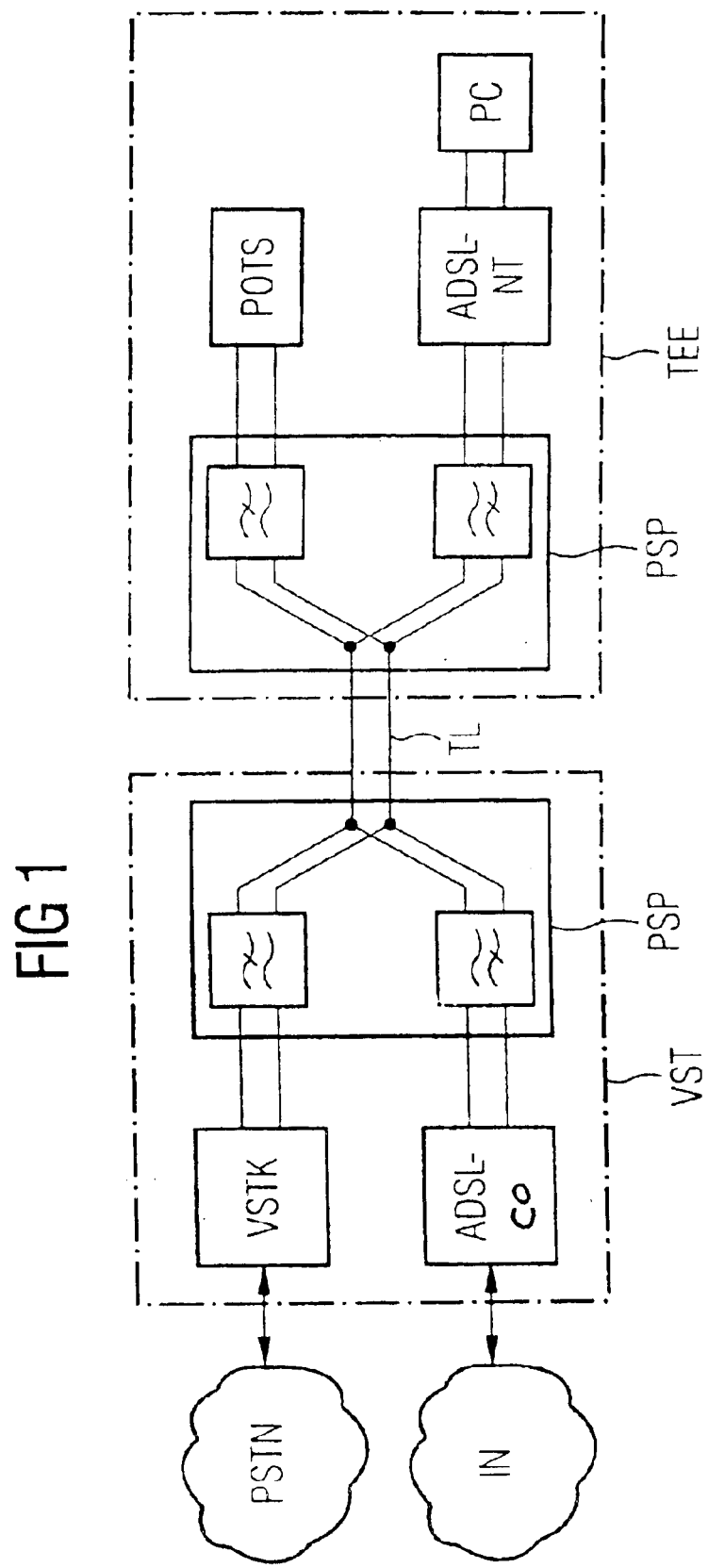
FIG. 1 is a block diagram of an arrangement for carrying out the inventive method of the present invention.

FIG. 1 illustrates a telephone-exchange VST and a subscriber terminal device TEE that are connected to one another by a subscriber line TL.

As terminal devices of the subscriber terminal device TEE, a telephone POTS and, as an example of a data terminal device, a personal computer PC are depicted.

The subscriber line TL respectively terminates at the subscriber side and at the network side with what is known as a POTS splitter PSP, which comprises a frequency separating filter that combines or separates the high-bit-rate data signals which are jointly transmitted on the subscriber line and which originate at the PC or are intended for the PC, and the voice signals, which originate at the telephone device or are intended therefor; and that ensures that the high-bit-rate data signals that are transmitted according to the aforementioned ADSL method are not disturbed by the high-frequency portions of the dial impulses that occur in the context of the handling of the telephone traffic.

As can be seen on the side of the telephone exchange VST, information that is transmitted from the subscriber terminal device TEE to the telephone exchange via the subscriber line TL, which is a matter of voice information, is fed to the core of the telephone exchange VSTK and is forwarded from there to a public telephone network PSTN, whereas the data information is fed to a device ADSL-CO and is forwarded from there to a data transmission network, which may be a matter of the Internet. A device ADSL-NT corresponding to the device ADSL-CO is provided on the subscriber side as a component of the subscriber terminal device TEE to which the aforementioned PC is connected.

The devices ADSL-CO and ADSL-NT are actually responsible for the high-bit-rate data transmission on the subscriber line TL, whereby the devices ADSL-NT ensures that the digital information originating at the data terminal device PC is suitably converted into analog signals for transmission in a data transmission channel formed on the subscriber line TL so as to lie over the voice channel or it ensures a suitable reconversion in the direction of transmission leading toward the subscriber terminal device TEE. The device ADSL-CO in the telephone exchange VST must ensure that the data signals coming from the subscriber terminal device TEE are converted again into digital form and that they are suitably packeted if, as indicated, the data transmission network is a matter of the Internet; or the device ADSL-CO must ensure that inverse operations are performed, accordingly, in a transmission from the data network to the subscriber terminal device TEE.

Since, in the transmission of the high-bit-rate data, the core region VSTK of the telephone exchange VST is circumvented and so does not load the telephone network, the connection for transmitting the high-bit-rate data is set up as a permanent connection between the aforementioned devices ADSL-NT and ADSL-CO and an access device, which is not illustrated, to the data network, for instance the Internet, whereby this access device may also be a component of the telephone exchange VST.

To set up such a permanent connection, a complex protocol must be exchanged during a start-up phase, with which protocol the device ADSL-CO and ADSL-NT are adapted to the respective line characteristics in a training phase and then mutually communicate their respective configuration. This communication also relates to the allowed bit rates for the high-rate-channel and to the method for separating directions of forward and back channels.

The permanent connection remains in constant operation, even when there is no data transmission. As a result, there is a constant power loss in the device ADSL-CO and ADSL-NT, which naturally results in a corresponding heating of these devices and in the environment thereof, which represents an appreciable disadvantage particularly in the device ADSL-CO at the network side.

The present invention provides assistance here in that, in this device ADSL-CO at the network side and/or in the device ADSL-NT at the subscriber side, outside the context of a data transmission, only those parts are operative which serve to watch for criteria indicating the intent to transmit data, and the remaining parts are switched into the operative state only when such a criterion is detected.

Figure 2:
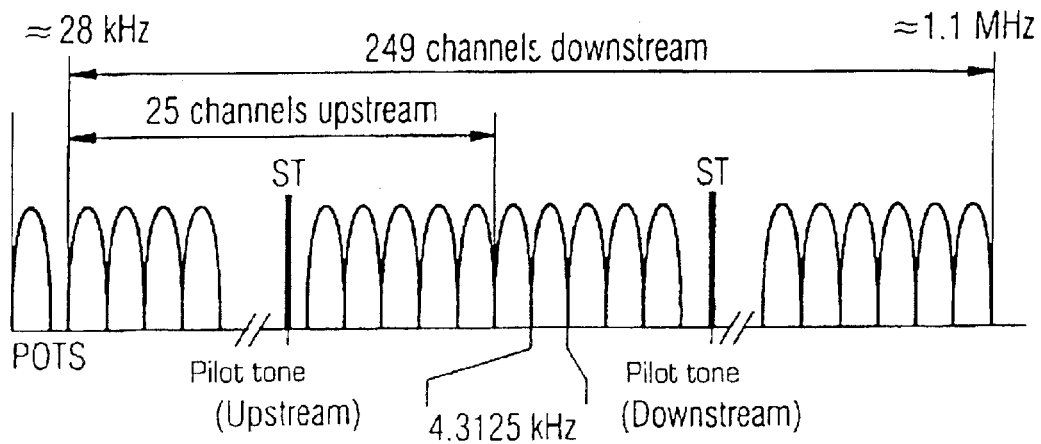
FIG. 2 shows the frequency spectrum of an ADSL system with DMT transmission.

FIG. 2 depicts the splitting of the frequency band on the subscriber line TL given the use of the ADSL system and in this context given the use of the DMT (Discrete Multi Tone) transmission method that is currently applied in ADSL systems in addition to the CAP method (Carrierless AM/PM).

In the DMT method, a number of carrier signals are used for the data transmission which form lower channels in the region of 0 to 1.1. Mhz. The spectrum from 0 to 4 kHz is reserved for voice signal transmission (POTS). There are 249 channels available for the transmission from the telephone exchange VST to the terminal device TEE (downstream); 25 channels are provided for the transmission in the opposite direction (upstream). The illustration according to FIG. 2 presumes the use of an echo compensation, whereby the 25 lowest channels of the spectrum provided for the high-bit-rate transmission can be exploited for both the upstream traffic and the downstream traffic. Alternatively, a transmission in the frequency divided layer method would also be possible.

FIG. 2 further illustrates that a signaling tone PT can occur in both the upstream data stream and in the downstream data stream. The downstream signaling tone has been exploited for purposes of synchronization in the device ADSL-NT.

These signaling tones, particularly the upstream signaling tone, are now exploited as identifiers for the intent to transmit data.

Figure 3:
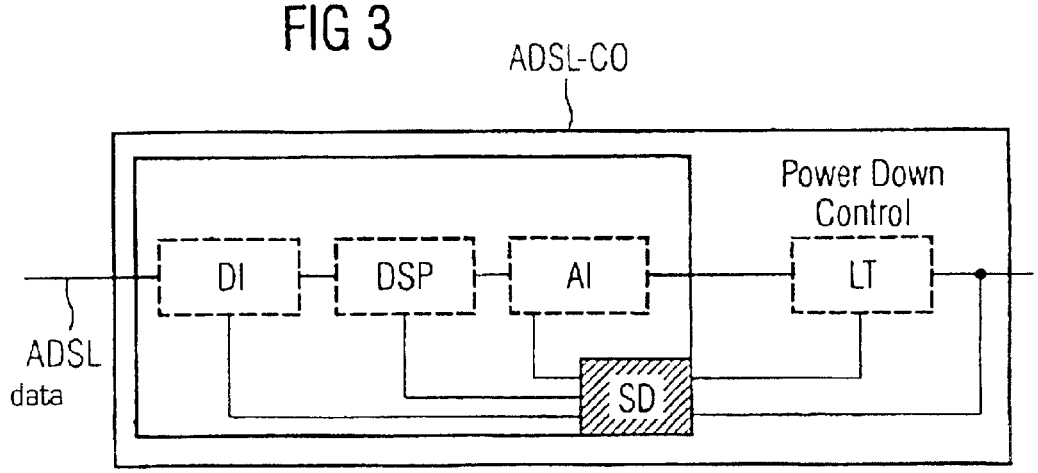
FIG. 3 is a block diagram of the device at the network side for an ADSL data transmission.

FIG. 3, in which a device ADSL-CO is illustrated in greater detail, depicts the subdividing of this device ADSL-CO into two groups of components. In operating states in which data transmission does not occur the components drawn in dotted lines, namely a digital interface DI, a digital signal processor DSP and an analog interface AI, as well as an allocated line driver LT, are switched into a power-down mode in which they are not operative and consume little or no power. Only the signaling tone detector SD that is drawn in solid lines is continuously operative while the line is inactive and monitors the subscriber line for the occurrence of a signaling tone in order to switch said parts DI, DSP, AI and LT between the power-down mode and the mode of full operativeness, accordingly. In this way, despite the existence of a permanent connection, power is consumed in greater amounts only during an actually occurring transmission of data, making it possible to reduce the overall power consumption quite significantly.

The signaling tone detector SD can comprise an adjustable bandpass with selectable parameters (middle frequency, bandwidth, detection threshold) by which it is possible to adapt to different variants for realizing ADSL.

The evaluation of the signaling tone can take place permanently or at defined intervals.

The inventive method can of course be applied to other xDSL methods if an unambiguous signaling of the intent to transmit data is provided.

Although modifications and changes may be suggested by those of ordinary skill in the art, it is the intention of the inventors to embody within the patent warranted hereon all changes and modifications as reasonably and properly come within the scope of their contribution to the art.

We claim as our invention:

1. A method for operating high-bit-rate data transmission devices on a subscriber line connecting a subscriber terminal device and a telephone exchange, wherein voice information and low-bit-rate data can also be transmitted on the subscriber line, and wherein during a transmission of high-bit-rate data, a connection for transmitting the high-bit-rate data bypasses a core region of the telephone exchange and connects to a data transmission network as a permanent connection between a high-bit-rate data transmission device at the subscriber side and a high-bit-rate data transmission device at the telephone exchange side and an access device of the data transmission network, the method comprising the steps of:

in a high-bit-rate data transmission device that terminates a subscriber line at a telephone exchange side and in a high-bit-rate data transmission device that terminates the subscriber line at a subscriber side, outside a context of a data transmission, operating only a signal tone detector to detect an occurrence of a pilot tone in an upstream or downstream channel indicating a beginning of a data transmission; and operating remaining parts of the high-bit-rate data transmission devices only when the signal tone detector detects the occurrence of the pilot tone in the upstream or downstream channel, wherein a digital interface, digital signal processor, analog interface, and a line driver in the high-bit-rate transmission device are switched into an operative state only upon detection of the pilot tone.

2. The method according to claim 1, further comprising operating the signal tone detector continuously.

3. The method according to claim 1, further comprising operating the signal tone detector at definite intervals.

4. An arrangement for transmitting high-bit-rate data on a subscriber line, said subscriber line for transmitting high-bit-rate data, voice information and low-bit-rate data, said arrangement comprising:

a subscriber terminal device having a first high-bit-rate data transmission device connected to a subscriber side of a subscriber line, said first high-bit-rate data transmission device having a number of first parts being operated only during a transmission and having at least one second part, other than said first parts, being operated outside a context of a data transmission and for evaluating a criterion which indicates a beginning of a data transmission and which is applied for purposes of activating said first high-bit-rate data transmission device, wherein the at least one second part of the first high-bit-rate data transmission device is a signal tone detector configured to detect an occurrence of a pilot tone in an upstream or downstream channel and the number of first parts of the first high-bit-rate data transmission device are operated only when the signal tone detector detects the occurrence of the pilot tone in the upstream or downstream channel, and wherein only the signal tone detector is operable when data is not being transmitted;

a telephone exchange having a second high-bit-rate data transmission device connected to a network side of the subscriber line, said second high-bit-rate data transmission device having a number of first parts being operated only during a transmission and having at least one second part, other than said first parts, being operated outside a context of a data transmission and for evaluating a criterion which indicates a beginning of a data transmission and which is applied for purposes of activating said first high-bit-rate data transmission device, wherein the at least one second part of the second high-bit-rate data transmission device is a signal tone detector configured to detect an occurrence of a pilot tone in an upstream or downstream channel and the number of first parts of the second high-bit-rate data transmission device are operated only when the signal tone detector detects the occurrence of the pilot tone in the upstream or downstream channel, and wherein only the signal tone detector is operable when data is not being transmitted, wherein a digital interface, digital signal processor, analog interface, and a line driver in the high-bit-rate transmission device are switched into an operative state only upon detection of the pilot tone; and an access device for accessing a network connected via permanent connection to said first and second high-bit-rate data transmission devices, said permanent connection for transmitting said high-bit-rate data and bypassing a core region of said telephone exchange.

5. A method for operating high-bit-rate data transmission devices on a subscriber line connecting a subscriber terminal device and a telephone exchange and having a permanent connection between a high-bit-rate transmission device at a subscriber side and a high-bit-rate transmission device at a telephone exchange side, comprising:

monitoring the subscriber line for an occurrence of a pilot tone in an upstream or downstream channel of a xDSL system, for detection in a signaling tone detector of a high-bit-rate transmission device, wherein all components of the high-bit-rate transmission device other than the signaling tone detector are inoperative when data transmission does not occur; and switching the respective high-bit-rate transmission device into an operative state upon detection of a pilot tone;

wherein an occurrence of the pilot tone indicates a beginning of data transmission, and all remaining parts components of the high-bit-rate transmission device are switched into an operative state only when the pilot tone is detected, wherein a digital interface, digital signal processor, analog interface, and a line driver in a high-bit-rate transmission device are switched into an operative state only upon detection of the pilot tone.

6. The method of claim 5, wherein the step of monitoring the subscriber line for an occurrence of a pilot tone occurs continuously.

7. The method of claim 5, wherein the step of monitoring the subscriber line for an occurrence of a pilot tone occurs at regular intervals.

8. A system for transmitting high-bit-rate data on a subscriber line between a subscriber terminal and a network terminal, said high-bit-rate data to be transmitted in conjunction with any of voice information or low-bit-rate data, comprising:

a first high-bit-rate transmission device connected to a subscriber side of the subscriber line; and a second high-bit-rate transmission device connected to a network side of the subscriber line;

wherein the high-bit-rate transmission device at either a subscriber side or network side comprises a signaling tone detector for detecting occurrences of a pilot tone in an upstream or downstream channel of an xDSL system, the signaling tone detector operates separately from all other components of the high-bit-rate transmission device for performing data transmission, and the all other components of the high-bit-rate transmission device for performing data transmission are inoperative when data transmission does not occur and are switched into an operative state only when the pilot tone is detected, wherein a digital interface, digital signal processor, analog interface, and a line driver in the high-bit-rate transmission device are switched into an operative state only upon detection of the pilot tone.

9. The system of claim 8, wherein all other components of the high-bit-rate transmission device for performing data transmission include at least one of a digital interface, a digital signal processor, an analog interface, and a line driver.

10. A high-bit-rate transmission device for performing high-bit-rate data transmission between a subscriber side and a network side of a subscriber line, comprising:

a signaling tone detector for detecting occurrences of a pilot tone in an upstream or downstream channel of an xDSL system; and a plurality of components other than the signaling tone detector for performing data transmission, operating separately from the signaling tone detector, wherein all components of the plurality of components other than the signaling detector are inoperative when data transmission does not occur; and wherein an occurrence of the pilot tone indicates a beginning of data transmission, and any component of the plurality of components other than the signaling detector of the high-bit-rate transmission device is switched into an operative state only when the pilot tone is detected, wherein a digital interface, digital signal processor, analog interface, and a line driver in the high-bit-rate transmission device are switched into an operative state only upon detection of the pilot tone.

11. The device of claim 10, wherein components for performing data transmission include at least one of a digital interface, a digital signal processor, an analog interface, and a line driver.

12. The device of claim 10, wherein the high-bit-rate transmission device operates in an inactive state until a pilot tone is detected in the signaling tone detector.

* * * * *